United States Patent
Fontaine

(10) Patent No.: US 6,963,738 B1
(45) Date of Patent: Nov. 8, 2005

(54) METHOD FOR EVALUATING A COMMUNICATION LINK, TERMINAL AND SYSTEM THEREFOR

(75) Inventor: José Fontaine, Vendeuvre (FR)

(73) Assignee: Actaris S.A.S., Montrouge (FR)

(*) Notice: Subject to any disclaimer, the term of this patent is extended or adjusted under 35 U.S.C. 154(b) by 253 days.

(21) Appl. No.: 10/311,910

(22) PCT Filed: Jun. 23, 2000

(86) PCT No.: PCT/FR00/01759

§ 371 (c)(1),
(2), (4) Date: Mar. 14, 2003

(87) PCT Pub. No.: WO01/98791

PCT Pub. Date: Dec. 27, 2001

(30) Foreign Application Priority Data

Jun. 17, 1999 (FR) .................................. 99 07803

(51) Int. Cl.[7] ............................. H04Q 7/34; H04Q 7/20
(52) U.S. Cl. ..................... 455/405; 455/403; 455/423; 455/424; 455/425; 455/67.11; 455/115.1; 455/226.1; 340/870.02; 340/870.03; 340/3.1
(58) Field of Search ............................ 455/403, 405, 455/406, 407, 408, 414.1, 422.1, 7, 9, 423, 455/424, 425, 500, 5.7, 67.11, 418, 419, 420, 455/426.1, 426.2, 507, 508, 67.14, 69, 73, 455/77, 550.1, 90.3, 127.1, 127.2, 120, 115.4, 455/115.1, 226.1; 340/870.02, 870.03, 3.1

(56) References Cited

U.S. PATENT DOCUMENTS

| | | | |
|---|---|---|---|
| 4,022,977 A | | 5/1977 | Nomura |
| 5,245,633 A | | 9/1993 | Schwartz et al. |
| 5,448,230 A | * | 9/1995 | Schanker et al. ...... 340/870.03 |
| 6,078,785 A | * | 6/2000 | Bush ............................ 455/7 |
| 6,208,266 B1 | * | 3/2001 | Lyons et al. ........... 340/870.02 |
| 6,333,975 B1 | * | 12/2001 | Brunn et al. ........... 379/106.03 |
| 6,737,985 B1 | * | 5/2004 | Garrard et al. ........ 340/870.02 |

FOREIGN PATENT DOCUMENTS

JP          11177704          7/1999

* cited by examiner

Primary Examiner—Keith Ferguson
(74) Attorney, Agent, or Firm—Straub & Pokotylo; Michael P. Straub

(57) ABSTRACT

A communications link is evaluated between a communications module connected to a meter and a remote reading terminal. The communications link is established between the meter's communications module and the remote reading terminal under given operating conditions. Then, under substantially the same operating conditions, at least one of the communications parameters of the remote reading terminal is controllable attenuated, and a detection operation is performed to determine whether the communications link between the meter's communications module and the remote reading terminal is still established. Communications parameters of the remote reading terminal that are controllably attenuated, either alone or in combination, include transmitter power and receiver sensitivity.

9 Claims, 1 Drawing Sheet

METHOD FOR EVALUATING A COMMUNICATION LINK, TERMINAL AND SYSTEM THEREFOR

The present invention relates to a method of evaluating a communications link between a transmitter or first transceiver and a remote receiver or second transceiver. The invention also relates to a terminal for implementing the method and to a system including such a terminal. The invention applies in particular to the field of reading meters remotely, which meters may serve to measure consumption of water, gas, electricity, or heat.

BACKGROUND OF THE INVENTION

Such meters need to be read regularly in order to determine the amount that has been consumed, in particular for billing purposes. In conventional manner, a technician reads a meter by visiting the premises where the meter is installed. However, it is sometimes difficult to gain access to a meter, for example when the meter is installed in private premises and the occupier is not present when the technician calls. In addition, visiting each person having a meter slows down the operation of reading meters.

That is why systems for reading meters remotely have been developed that enable an operator traveling in a given geographical zone to read the meters situated in that zone remotely. In another type of configuration, the meters communicate with a fixed receiver within the zone in question.

The main types of communication implemented are radio communications or wire communications (a cable network). Each meter in a zone is provided with a transmitter or a transceiver, often referred to as a "communications module", that is suitable for communicating with a receiver or a transceiver, often referred to as a "terminal" or a "concentrator", and which may be stationary or mobile within the zone in question.

The communications module transmits the information it has to send concerning the meter to which it is connected either in response to an interrogation signal transmitted by the terminal, or else substantially periodically. The terminal receives this information which is then processed, e.g. for statistical or billing purposes.

As a general rule, the communications link is tested during installation. However such tests need to be performed by competent technicians since they implement sophisticated apparatuses that are different from those used subsequently in remote meter-reading operations.

In addition, even if a link is cleared during testing, there is no guarantee that the link will not deteriorate as its electronic components age, or as weather or other conditions surrounding the meter change, etc. For example, it is known that the performance of radio transmitters varies as a function of temperature. A link that was tested in summer and found to be satisfactory can fail in winter. Or indeed the operation of a communications module can be disturbed if its environment is changed: moving a domestic appliance close to a meter situated in a kitchen, for example, can cause a link to become unusable.

It is therefore desirable to be able to quantify the quality of the communications link of each communications module. When the operating margin is sufficient, it can be expected that the communications link will suffice even in the event of disturbance appearing such as the aging of electronic components, a change of temperature, a change of environment, etc.

However, it is also desirable to perform such measurements without it being necessary to visit each communications module and without it being necessary to implement sophisticated and expensive measurement equipment.

OBJECTS AND SUMMARY OF THE INVENTION

The present invention enables these objects to be achieved. More precisely, the present invention provides a method of evaluating a communications link between a communications module connected to a meter and a remote reading terminal, the method consisting in:

establishing the communications link between a module and a terminal under given operating conditions; and under substantially the same operating conditions, acting in controlled manner on at least one of the communications parameters of the terminal, and detecting whether the communications link between the module and the terminal is established.

The communications parameters of the remote reading terminal are essentially constituted by receiver sensitivity, and also by transmitter power if the terminal has a transmitter.

The operating conditions are those that apply at the time the communications link is established. These conditions are not necessarily known at the time of evaluation. For example, the real effect of electronic components aging in the communications module is poorly determined. However the important point is that the conditions should not vary perceptibly during the evaluation steps.

A decisive advantage of the method of the invention consists in testing the link from the terminal only, without it being necessary to visit the communications module, to simulate it, or to handle it. The test is performed using the devices that are normally used for providing remote reading communications and in a manner that is extremely simple and quick.

In the method of the invention, it is possible to estimate whether the communications link continues to be established under degraded communications conditions and to estimate its operating limits. On the basis of this information, it is possible to predict whether the communications link will continue to be established, in spite of variations in its operating conditions.

In a particular implementation of the method of the invention, the link is degraded by taking controlled action on at least one of the communications parameters of the terminal until the link is interrupted. The action can be taken continuously or it can be performed in increments. Knowing the communications parameters or values applicable when the link is established both under initial conditions and when the link is interrupted makes it possible to deduce an operating margin that is expressed in dB. This operating margin gives an idea about the ability of the link to withstand disturbances.

As a function of the measured operating margin, it is possible, for example, to establish whether the link will continue to be established in satisfactory manner in spite of temperature variations, while other operating conditions remain substantially constant.

In conventional manner, it is assumed that variations in operating conditions, all disturbances combined, correspond to an operating parameter being attenuated by at least about 6 dB. That is why in another implementation of the method, the value of at least one communications parameter is attenuated by some fixed number of decibels, e.g. 6 dB, corresponding to a disturbance to the communications link that is representative of the usual disturbances to which the link might be subject over time.

In a variant, the controlled action consists in attenuating the power transmitted from the remote reading terminal.

In another variant, the controlled action consists in attenuating the receiver sensitivity of the remote reading terminal.

In another variant, the controlled action consists in simultaneously attenuating the power transmitted from the remote reading terminal and its receiver sensitivity. In the selected variant, the link is tested during the stage in which the terminal is transmitting on its own, the stage in which the terminal is receiving on its own, or during both stages.

The present invention also provides a remote reading terminal for implementing the method. The terminal comprises in particular an antenna connected to receiver means or to transceiver means. It also comprises an attenuator suitable for attenuating the receiver sensitivity of the terminal in controlled manner, or for attenuating its transmitted power, or for attenuating both of them.

It is emphasized once more that the extreme simplicity of the apparatus makes it possible to use the remote reading equipment itself for test purposes. It also has the advantage of being suitable for use by the remote reading operator without requiring a specialized technician or sophisticated and expensive equipment to be used.

Advantageously, the attenuator is programmable. Under such circumstances, the operator can select a desired operating mode: either to apply given attenuation of a value that can optionally be fixed by the operator, or else to apply attenuation progressively to at least one of the communications parameters over a given attenuation range, possibly until the link breaks down.

Finally, the present invention provides a remote reading system for implementing the method and further comprising at least one communications module connected to a meter, and at least one remote reading terminal of the invention.

BRIEF DESCRIPTION OF THE DRAWING

The following description which is given by way of non-limiting illustration refers to the accompanying drawing, in which.

MORE DETAILED DESCRIPTION

Figure 1:
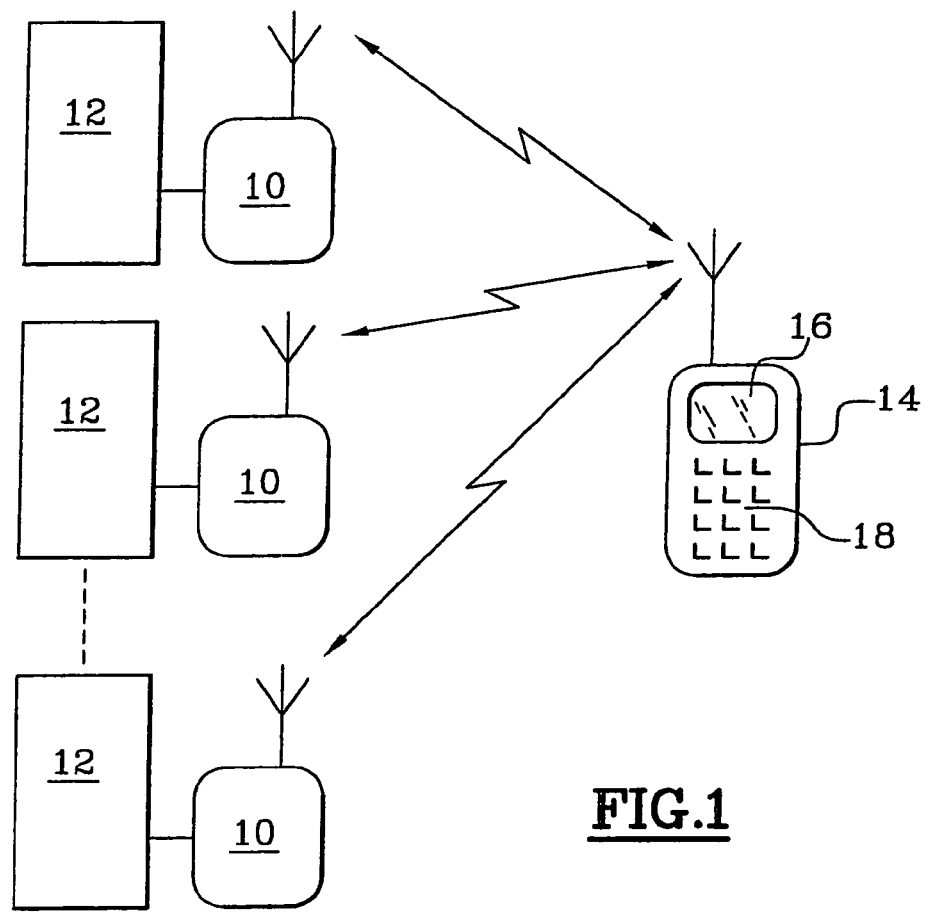
FIG. 1 is a diagram of a system for remote reading of meters by radio.

As can be seen in FIG. 1, a system for reading meters remotely comprises communications modules 10, each of the modules being connected to a meter 12. The communications module could equally well be integrated in a meter.

The communications module receives metering information from the meter together with certain other items of information such as the identity of a geographical zone, a number given to the meter, a fraud flag, etc.

This information is for transmission to a remote reading terminal 14. In the example described and shown, communication takes place over a radio link, however the link could equally well be provided over a cable network, with this being equivalent from the point of view of the invention.

In remote reading systems, the link between the module 10 and the terminal 14 can be of the one-way type, of the asymmetrical two-way type, or of the two-way type. In the first case, each module 10 periodically transmits the information for transmission; the module 10 has transmitter means only and the terminal has receiver means only. In the second case, each module 10 transmits information only after it has received a wakeup signal transmitted by the terminal 14; under such circumstances, the module 10 has receiver means in addition to its transmitter means, and the terminal 14 has transmitter means and receiver means. In the third case, the module 10 and the terminal 14 are capable of engaging in dialog, each of them having transmitter means and receiver means.

The remote reading terminal 14 can be fixed or mobile. When it is mobile, it can be on board a vehicle that moves through the meter reading zone or it can be carried by an operator.

The terminal 14 shown diagrammatically in FIG. 1 is of the portable type. It has a display 16 and pushbuttons 18 enabling various commands to be entered.

Figure 2:
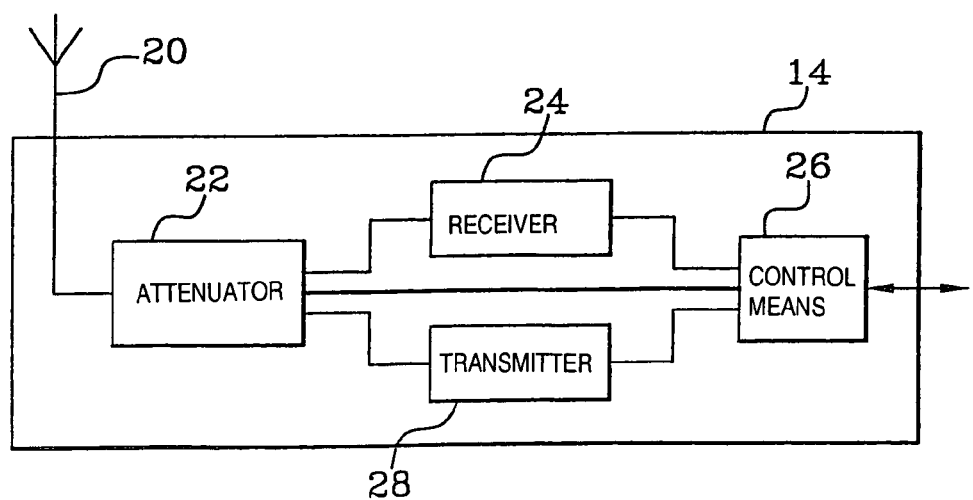
FIG. 2 is a block diagram of a remote reading terminal of the invention.

The terminal 14 is also shown in greater detail in diagrammatic and simplified manner in FIG. 2. It can be seen that it comprises an antenna 20 connected to an inlet/outlet of an attenuator 22. An outlet of the attenuator is connected to an inlet of receiver means 24. The receiver means 24 usually comprise a special circuit having a local oscillator for direct conversion without using an intermediate frequency, or else it comprises a frequency-lowering circuit connected to a local oscillator and to a demodulator. These circuits are well known to the person skilled in the art, and consequently a more detailed description is unnecessary.

The outlet from the receiver means is connected to monitoring and control means 26, e.g. a microprocessor which stores the information received, processes it, and performs any operation that is necessary for optionally monitoring and controlling the various components of the terminal, such as the display 16 for example. The microprocessor can be connected to other elements of the terminal 14 (not shown) or to external peripherals (not shown) which serve, for example, to process the data or to store it.

In the example shown in FIG. 2, the terminal 14 also has transmitter means 28 connected to an inlet of the attenuator 22 and to the monitoring and control means 26 which store the information to be transmitted and which apply it to the transmitter means 28. These means mainly comprise an amplifier stage and an HF filter to filter the harmonics of the signal for transmission. Transmitter means are well known to the person skilled in the art, and a detailed description thereof is unnecessary.

On reception, the signal received by the antenna 20 is applied to the attenuator 22. In normal operation, it applies zero attenuation. While evaluating a communications link, its attenuation is applied directly by the operator pressing on a button 18 provided for this purpose or via the microprocessor 28 in turn triggered by pressing a pushbutton 18 provided for this purpose, or by any other suitable commands, including a software command. If tests are being performed by an installer, attenuation may be variable so as to determine the operating margin and ensure that the communications modules linked with the terminal are operating properly. When tests are performed by a meter-reading operator, it is preferable for attenuation to be selected to have a fixed value.

Depending on the selected mode of operation, the optionally-attenuated signal is then applied to the receiver means 24 which processes it in normal manner and apply the processed signal to the microprocessor 26.

In transmission, the microprocessor 26 communicates with the transmitter means 28, specifying the data to be transmitted together with any appropriate commands or information. The data is processed in conventional manner by the transmitter means and is applied to the attenuator 22 whose attenuation setting depends, as above, on the selected operating mode. The attenuator 22 delivers the signal for transmission to the antenna 20.

The attenuator can be of any known type, for example, the attenuator sold by Signal Technology Corporation under the reference DAT-9001, or that sold by M/A-COM under the reference AT20-0106, or indeed that sold by ELHYTE under the reference 50AP-016. Attenuators and the principles on which they operate are well known to the person skilled in the art so it is pointless to describe them in detail.

In one implementation, when an installer or a meter reading operator carrying a terminal 14 seeks to evaluate a communications link, it suffices to select this function by pressing the pushbutton 18 provided for this purpose, or on any other suitable control means, when this option is made available by the menu being scrolled on the display 16.

Initially, implementation steps are described below for a terminal that operates as a receiver only. Thus, by definition, a communications module 10 transmits a signal which is received by the terminal 14: the communications link is thus established under certain operating conditions. In other words, the temperature, the distance between the module 10 and the terminal 14, the electromagnetic environment, and all extrinsic parameters that might cause the quality of the communications link to vary are in some given state and ought to remain substantially in this state during evaluation.

To evaluate the link, the terminal 14 acts in controlled manner on the parameter applicable to receiver communication, specifically receiver sensitivity, attenuating this parameter by acting on the attenuator 22 in the receive path.

By way of example, two modes of evaluation are proposed using a menu that scrolls under the control of the microprocessor 26, or by any other suitable means.

In the first mode, under the control of the microprocessor 26, the attenuator 22 applies an increasing amount of attenuation in controlled manner to the received signal. The amount of attenuation can vary over the range 0 to 80 dB, for example. Attenuation thus increases and continues to increase so long as the link remains in operation.

In conventional manner, the receiver means 24 comprise an interface, often known as a UART, which enables received messages to be recognized. If during a given period of time, the UART does not recognize any message as being a message coming from a communications module, then it is considered that the link is not established.

By varying the amount of attenuation, it is thus possible to determine an attenuation value beyond which the link breaks down. This limit value corresponds to an operating margin. The greater the margin, the less the link is likely to be affected by variations in operating conditions.

By measuring the attenuation on breakdown of the link, the microprocessor 26 determines an operating margin which is displayed in dB on the display 16.

In this manner, during evaluation, messages can be displayed concerning the quality of the link as a function of the amount of attenuation. By way of example, these messages can be follows: "communication good" if the link is judged to be satisfactory, i.e. if the UART recognizes a message transmitted by a communications module; or else "communication marginal" if, for example, after receiving a message with sufficient interference to prevent recognition by the UART, a message is subsequently recognized by the UART as coming from the communications module in question.

In a second mode, under a command issued, for example, by pressing on a suitable pushbutton 18 or controlled in equivalent manner by the microprocessor 26, the attenuator 22 applies a fixed amount of attenuation in controlled manner, e.g. 6 dB. This attenuation value is selected as being representative of ordinary disturbances to which a link might be subject. It takes account, for example, of component aging, including the drop in the voltage delivered by the battery powering the communications module, possible variations in temperature, and more generally any other type of disturbance. Thus, the quality of the link as analyzed by the microprocessor 26 after the attenuation has been applied is displayed by the display 16. A communications link that is found to be satisfactory even after attenuation has been applied can be considered as being suitable for establishing a link under good conditions even if operating conditions should vary.

Thus, by applying the method of the invention, the remote reading operator or the installer can quantify the quality of the communications link.

The operating modes described above are directly transposable to evaluating the communications link when the terminal operates as a transmitter. Under such circumstances, the communications parameter on which the attenuator 22 applies attenuation in controlled manner is the transmitter power of the transmission channel of the terminal.

As before, attenuation can be varied to increase over the range 0 to 80 dB and it can be applied until the microprocessor 26 detects that the link has broken down. This gives an operating margin as calculated by the microprocessor 26 and as displayed on the display 16. It is also possible for attenuation to be fixed at a determined value as above.

The operating modes described above are also directly transposable to the attenuator 22 applying attenuation both to transmitter power and to receiver sensitivity.

If evaluation tests are performed on each occasion that the remote reading operator performs a round, with previous results being conserved, then statistics can show how a link is varying over time, thus making it possible to detect anomalies and to forestall failures.

In applying the method of the invention, the remote reading operator can easily estimate the quality of the communications link and can possibly recommend or perform maintenance action if the link does not present a sufficient operating margin. The method can be implemented using ordinary remote reading terminals that have been modified in a manner that does not give rise to a large amount of extra cost.

The method can also be applied when installing meters on site, so as to be sure that all of the communications modules operate acceptably with a terminal.

What is claimed is:

1. A method of evaluating a communications link between a communications module connected to a meter and a remote reading terminal, the method comprising:
    establishing said communications link between said communications module and said remote reading terminal under given operating conditions; and
    under substantially the same operating conditions, attenuating in a controlled manner at least one communications parameter of said remote reading terminal, and detecting whether the communications link between the module and the terminal is established,
    wherein said at least one communications parameter is at least one of a transmitter power and a receiver sensitivity.

2. The evaluation method according to claim 1, wherein said step of attenuating in a controlled manner at least one communications parameter of said remote reading terminal is performed until the communications link is no longer established, the evaluation method further comprising:

deducing an operating margin of said communications link.

3. The evaluation method according to claim 1, wherein said step of attenuating in a controlled manner includes attenuating the value of at least one communications parameter of the remote reading terminal by a fixed number of decibels.

4. The evaluation method according to claim 1, wherein said at least one communications parameter is transmitter power and wherein said step of attenuating in a controlled manner includes attenuating the transmitter power of the remote reading terminal.

5. The evaluation method according to claim 1, wherein said at least one communications parameter is receiver sensitivity and wherein said step of attenuating in a controlled manner includes attenuating the receiver sensitivity of the remote reading terminal.

6. The evaluation method according to claim 1, wherein said at least one communications parameter includes both transmitter power and receiver sensitivity and wherein said step of attenuating in a controlled manner includes simultaneously attenuating the transmitter power of the terminal and its receiver sensitivity.

7. A remote reading terminal for implementing an evaluation method according to claim 1, the terminal comprising at least one antenna and signal receiver means or transceiver means connected to the antenna, the terminal further comprising an attenuator suitable for attenuating in a controlled manner the receiver sensitivity of the terminal, or its transmitter power, or both receiver sensitivity and transmitter power.

8. The remote reading terminal according to claim 7, wherein said attenuator is programmable.

9. A meter remote-reading system for implementing a method of evaluating a communications link according to claim 1 and including at least one remote reading terminal comprising at least one antenna and signal receiver means or transceiver means connected to the antenna, the terminal further comprising an attenuator suitable for attenuating in a controlled manner the receiver sensitivity of the terminal, or its transmitter power, or both receiver sensitivity and transmitter power.

* * * * *